United States Patent Office 3,432,333
Patented Mar. 11, 1969

3,432,333
COMPOSITE DIFFERENTIAL RELEASE TAPE
Alan R. Hurst, Hinsdale, Ill., assignor to Phillips Petroleum Company, a corporation of Delaware
No Drawing. Filed Feb. 28, 1966, Ser. No. 530,378
U.S. Cl. 117—68                          15 Claims
Int. Cl. B44d 1/10; B32b 7/06; C09j 7/04

This invention relates to composite differential release tapes. In one aspect this invention relates to methods for fabricating composite differential release tapes.

Release papers are widely used in a variety of commercial applications. For example, decals, labels, tape, and the like, which employ a pressure-sensitive adhesive, utilize a protective release paper over said adhesive. When such a product is used, the release paper is peeled off and discarded and the exposed pressure-sensitive tape pressed onto the surface where the decal or label is to be placed. A common variety of release paper is one wherein one side thereof (the release side) is coated with a polymeric silicone material commonly referred to as silicones.

In certain fabricating processes a mastic or adhesive material is applied to a first member as a bonding agent and a second member is then placed on said mastic or adhesive so as to bond said members together. In such instances it is desirable to furnish the mastic or adhesive in rolls, e.g., rolled up in a release paper. In order to accomplish this, it is necessary that both sides of the release paper have release characteristics in order that the paper can be readily removed from the mastic or adhesive. In such instances it is desirable that one side of the paper have lower release values than the opposite sides of the paper. Then, as the roll of mastic or adhesive is unrolled, one side of the paper readily releases from the mastic or adhesive as said mastic or adhesive is placed on the first member, but the other side having the higher release value adheres to the mastic or adhesive. After said mastic or adhesive has been placed in position on the first member, the release paper is removed therefrom and the second member is applied to the layer of mastic or adhesive so as to bond said first and second members together.

In release papers having both sides coated with a cured organopolysiloxane, attempts have been made to control the release characteristics of the opposite sides of the paper. These attempts have included varying the amount or thickness of the silicone coating, and various variations in techniques of applying said silicone coatings. In general, these methods have not been too successful and have left much to be desired. The organopolysiloxanes have such excellent release properties that it is very difficult to obtain sufficient difference between the release characteristics of the two opposite sides of the paper. I have now discovered that this problem can be solved and the above difficulties eliminated by applying a coating of a filled organopolysiloxane having incorporated therein a finely divided particulate filler to one side of the paper and applying a coating of an unfilled organopolysiloxane to the opposite side of the paper. The filled organopolysiloxane on the one side of the paper, when cured, provides a surface having definitely higher release values than the surface of the cured unfilled organopolysiloxane on the opposite side of the paper. I have also discovered that by varying the amount and/or type of filler incorporated in said filled organopolysiloxane the difference in release values between the two sides of the tape can be readily controlled and tailored to desired levels.

Thus, broadly speaking, the present invention resides in a composite differential release tape comprising a substrate having a cured coating of a filled organopolysiloxane bonded to one side thereof, and a cured coating of an unfilled organopolysiloxane bonded to the opposite side of said substrate; and methods of fabricating said tape.

An object of this invention is to provide an improved composite differential release tape. Another object of this invention is to provide an improved composite differential release tape one side of which is characterized by having higher release values than the opposite side thereof. Another object of this invention is to provide a composite differential release tape having one side thereof coated with a cured filled organopolysiloxane and the opposite side thereof coated with an unfilled organopolysiloxane. Another object of this invention is to provide a composite differential release tape wherein the difference in release values for the opposite sides of the tape can be controlled and tailored to desired levels. Another object of this invention is to provide a composite differential release tape which is dimensionally stable. Another object of the invention is to provide methods of fabricating the various composite differential release tapes of the invention. Other aspects, objects, and advantages of the invention will be apparent to those skilled in the art in view of this disclosure.

Thus, according to the invention, there is provided a composite differential release tape comprising: a substrate; a cured coating of a filled organopolysiloxane bonded to one side of said substrate; and a cured coating of an unfilled organopolysiloxane bonded to the opposite side of said substrate; said filled organopolysiloxane having incorporated therein, in an amount sufficient to increase the release value of said cured filled organopolysiloxane coating to a value greater than the release value of said cured unfilled organopolysiloxane coating, finely divided particles of a filler which is essentially chemically inert with respect to said organopolysiloxane.

Further according to the invention, there are provided methods of fabricating the composite differential release tapes of the invention, said methods comprising controlling the difference between the release values of the opposite sides of the tape by varying the amount and/or type of filler incorporated in the filled organopolysiloxane coating material used to coat one side of the tape.

The invention is not limited to employing paper as said substrate. A wide variety of substrates can be employed in the practice of the invention. Any suitable substrate to which an organopolysiloxane can be bonded can be employed in the practice of this invention. Examples of suitable substrate materials include, among others, paper, plastic films such as polyethylene film, polypropylene film, etc., textile fabrics made from materials of nature such as cotton, linen, etc., and synthetic textile fabrics such as nylon, Orlon, rayon, glass fabrics, etc. Flexible substrates are presently preferred. However, it is within the scope of the invention to employ substrate materials which are nonflexible or substantially nonflexible.

Paper is a presently preferred substrate for use in the practice of the invention because of the wide variety of applications in which it can be employed. It should be understood that the invention is not limited to any particular type of paper. The invention is applicable to any paper having sufficient tensile strength to be handled in conventional paper coating and treating apparatus. Thus, the invention is applicable to all types and weights of paper ranging from glassine to heavy paperboard, e.g., having weights in the range of from 25 to 150 pounds per ream.

A wide variety of filler materials can be employed in the practice of the invention. Said filler materials can be either inorganic or organic. The only really essential requirements with respect to said filler materials are (a) that they be essentially chemically inert with respect to the organopolysiloxanes and (b) substantially insoluble in the solvent or solvents used as vehicle in applying the organopolysiloxanes. The filler materials should be sufficiently heat resistant to withstand the temperatures employed in curing the organopolysiloxane. Thus, a wide variety of filler materials which can be incorporated in the organopolysiloxane solutions in finely divided form, and remain essentially so in the cured coating, can be employed in the practice of the invention.

Examples of inorganic filler materials which can be employed in the practice of the invention include, among others, the following: calcium carbonate, titanium dioxide, silica, alumina, Wyoming bentonite, diatomaceous earth, calcium silicate, lithopone, zinc oxide, iron oxide, other polyvalent metal oxides, mica, asbestos, and fiber glass. Calcium carbonate and titanium dioxide are representative of preferred inorganic filler materials.

Examples of organic filler materials which can be employed in the practice of the invention include, among others, the following: poly(vinyl chloride); polyesters such as Mylar; polyamides such as nylon; polycarbonates such as Lexan; acetal resins such as Delrin; melamine-formaldehyde polymers; acrylonitrile-butadiene-styrene polymers; and other thermoplastic or thermosetting polymers or resins. Poly(vinyl chloride) is representative of a presently preferred organic filler material.

The choice of the particular filler material to be employed will depend to a large extent upon the properties desired in and the end use of the final product. In some instances an inorganic filler material is preferred. In other instances an organic filler material is preferred. The particle size of said filler materials is not critical over a wide range so long as the material is in a finely divided state. For example, materials having particle sizes in the range of 0.1 to 250 microns, or greater, can be employed. Said filler materials are usually employed in a filler to silicone weight ratio within the range of from 0.25:1 to 3:1, based on the silicone solids in the organopolysiloxane coating composition. It is important that the filler material be thoroughly mixed into a uniform suspension in the organopolysiloxane coating composition. This mixing can be accomplished in any suitable manner employing known mixing means such as a ball mill, a Lightnin' mixer, a paint mill, etc. The mixing time will vary with the particular type of filler employed and can be readily determined in a few simple trial mixes by one skilled in the art. Usually said time will vary within the range of 1 to 20 hours.

A wide variety of organopolysiloxanes (commonly called "silicones") can be used in the practice of the invention. Said organopolysiloxanes are also sometimes referred to as polymeric silicone resins, rubbers, or oils. These compositions are well known and are fully described in the literature. These compositions are comprised essentially of silicon atoms connected to each other by oxygen atoms through silicon-oxygen linkages, e.g.,

  (1)

The compositions used in the practice of the invention are preferably, but not necessarily, high molecular weight polymers and copolymers having molecular weights in the range of 5,000 to 250,000. They should not have obtained such a degree of polymerization or condensation that they are no longer soluble in common hydrocarbon solvents such as xylene, toluene, methyl ethyl ketone, and carbon tetrachloride. In general, any organic solvent having a boiling point equal to or less than that of xylene can be used in the compositions used in the practice of the invention. The solvent merely serves as a convenient vehicle or carrier for uniform application to the substrate. Thus, higher boiling solvents can be used but require so much time for their removal that their use is not commercially economical. Various organopolysiloxanes are commercially available in organic solvents, in various percent solids concentration.

Generally speaking, organopolysiloxanes which can be used in the practice of the invention include those polymers wherein the recurring structural unit is

  (2)

those polymers wherein the recurring structural unit is

  (3)

those polymers wherein the recurring structural unit is

  (4)

and copolymers wherein the recurring structural units are (2) and (3) as above. In the above recurring structural units each R can be any suitable monovalent hydrocarbon radical such as alkyl, cycloalkyl, aryl, alkaryl, and aralkyl. Preferably, each R is selected from the group consisting of alkyl radicals containing from 1 to 6 carbon atoms, and phenyl. Compositions wherein each R is methyl, ethyl, or phenyl are presently more preferred.

Another type of structural unit which may be found in the above-described organopolysiloxanes in small amounts is

  (5)

wherein R is as defined above. This structural unit is found as a terminal unit in a polymer chain because the R groups are not capable of further condensing or cross-linking.

Examination of the above structural units (2), (3), and (4) shows that in a polymer consisting essentially of recurring units of (2) or (4) the R/Si ratio (numerical ratio of the number of R groups to the number of Si atoms) will approach 2 when one does not consider the terminal units (5). It is obvious that in the high molecular weight polymers (about 5,000 to about 250,000 molecular weight) it is perfectly proper to not consider the few terminal groups which will be present. Similarly, in a polymer consisting essentially of recurring units of (3), the R/Si ratio will approach 1. It is also within the scope of the invention to mix and use physical mixtures of said polymers consisting essentially of said recurring structural units (2), (3), and (4), and wherein the R/Si ratio is between about 1 and about 2. Thus, broadly speaking, the organopolysiloxanes which can be used in the practice of the invention are those having a R/Si ratio within the range of from about 1 to about 2.

However, the presently more preferred organopolysiloxanes for use in the practice of the invention are said copolymers consisting essentially of recurring structural units like (2) and (3) above, i.e.,

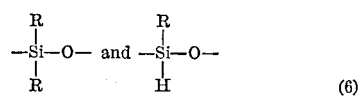  (6)

wherein each R is as defined above. Such copolymers can be prepared according to methods known to the art. For example, by hydrolyzing a mixture of desired amounts of dimethyldichlorosilane monomer and methylhydrogendichlorosilane comonomer,

  (7)

where $x$ and $y$ are integers which represent the amount in mols of the respective monomers used in said mixture and which determine the R/Si ratio in the copolymer. A small amount of trimethylchlorosilane, (CH₃)₃ClSi, is added to supply the terminal (CH₃)₃Si—end groups. Other methods of preparing said copolymers are known to the art. For example, said copolymers can be formed by preparing cyclic tetramers of each monomer in dilute solution in suitable solvent and then causing rearrangement of the cyclic compounds in the absence of solvent.

Preferred copolymers are those wherein the R/Si ratio is within the range of from about 1.75 to less than 2, more preferably about 1.9 to less than 2, still more preferably about 1.95 to about 1.99. When neglecting the (CH₃)₃Si—terminal groups as discussed above, the relationship between $x$ and $y$ and the R/Si ratio can be illustrated by the following tabulation, Table I.

TABLE I

| Mols of x | Mols of y | R/Si ratio |
|---|---|---|
| 100 | 0 | 2 |
| 99 | 1 | 1.99 |
| 95 | 5 | 1.95 |
| 75 | 25 | 1.75 |

It is obvious that the above relationships will not hold in low molecular weight copolymers because of the extra CH₃—group in the terminal group. However, in the high molecular weight copolymers used in the practice of the invention (about 5,000 to about 250,000 M.W.) the effect of said terminal groups can be disregarded.

The presently most preferred organopolysiloxane for use in the practice of the invention is a copolymer prepared, for example, by hydrolyzing a mixture such as (7) above wherein $x$ is about 95 and $y$ is about 5 to give a CH₃/Si ratio of about 1.95.

Since in the above illustrated monomers (7) each molecule of dimethyldichlorosilane monomer furnishes one structural unit (2) wherein R is CH₃—, and each molecule of methylhydrogendichlorosilane monomer furnishes one structural unit (3) wherein R is CH₃—, the preferred copolymers of the invention can be described as consisting essentially of the recurring structural units (2) and (3)

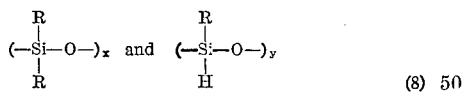

(8)

where R is as defined above, and $x$ and $y$ are as defined above and denote the relative numbers of said structural units in the copolymer and determine the R/Si ratio. For example, referring to Table I, when $x=95$ and $y=5$, the copolymer will contain 95 of the structural units (2) for each 5 of the structural units (3) and the R/Si ratio will be 1.95 when disregarding the terminal groups. Since there will always be some of the structural unit (3) present in the copolymer, the R/Si ratio will approach 2 for decreasing values of $y$ which are less than 1. However, when disregarding the terminal (R)₃Si— groups as discussed above, said ratio will always be less than 2.

The other above-described organopolysiloxanes can be prepared in a number of ways, all known in the art. For example, the preparation of methyl polysiloxane, also known as methyl silicone resins, is described in U.S. Patent 2,258,218. The preparation of ethyl polysiloxane resins, also known as ethyl silicone resins, is described in U.S. Patent 2,258,220. U.S. Patent 2,258,222 describes still other types of silicone resins wherein one methyl radical in the structural units described above is replaced with an aryl group, such as a phenyl group.

Other methods of preparing said organopolysiloxanes are described in U.S. Patent 2,494,920.

The above-described organopolysiloxanes in solution, and either filled or unfilled as described herein, are applied to the substrate surfaces in amounts, on a dry basis, within the range of from 0.03 to 0.4, preferably 0.06 to 0.25 pound per ream. Preferably, said organopolysiloxane is applied in two thin coats. However, it is within the scope of the invention to make the application in one coat. The amount and type of organopolysiloxane in each said coat on the same side or on opposite sides of the substrate can be the same or different.

The composition of the filled organopolysiloxane coating compositions which can be used in the practice of the invention can very over a wide range, depending upon the properties desired in the product tape. Usually the amounts of the components of said composition will be within the following ranges, in weight percent: polymeric silicone solids, from about 2 to about 10; filler, from 0.5 to about 30; and solvent, from about 60 to 97.5. Said solvent can be any of the solvents normally used for preparing solutions of organopolysiloxanes as set forth above. When the filler is one of the above-described organic fillers, it is sometimes desirable that from about 4 to about 10 percent of said solvent be an aliphatic hydrocarbon containing from 5 to 9 carbon atoms per molecule, or mixtures thereof such as light naphthas and gasolines, to control the solubility of said filler in the overall solvent. Paraffinic and isoparaffinic hydrocarbons are preferred.

Prior to application of the organopolysiloxane coating composition, a small amount of a suitable catalyst or curing agent is added thereto. Suitable catalysts for this purpose include dibutyl tin di-2-ethyl hexanoate, dibutyl tin dilaurate, dibutyl tin diacetate, tributyl tin acetate, diethylene triamine, triethylene tetramine, various lead salts such as lead naphthenate and lead octoate, zinc octoate, zinc stearate, iron octoate, various organic peroxides such as benzoyl peroxide, and others. The amount of said curing agents or catalysts used is not critical and can be varied widely depending upon the curing temperature, the particular catalyst used, desired curing time, the particular silicone polymer, etc. Usually, the amount used will be from 1 to 10 weight percent of the silicone polymer.

In a first embodiment, a composite differential release tape of the invention can be fabricated by applying a coating of an unfilled organopolysiloxane directly to one side of a substrate, such as paper, and applying a coating of a filled organopolysiloxane directly to the opposite side of said substrate.

In a second embodiment, a composite differential release tape of the invention can be fabricated by applying a coating of a polyolefin, such as polyethylene, to one side of a substrate, such as paper, and an overcoat of a filled organopolysiloxane is applied to said coating of polyolefin. A coating of an unfilled organopolysiloxane is applied to the opposite uncoated side of said substrate. If desired, the applications of said organopolysiloxanes can be reversed, e.g., the unfilled organopolysiloxane can be applied as an overcoat on said polyolefin coating and the filled organopolysiloxane can be applied to the uncoated side of said substrate.

In a presently preferred embodiment, the composite differential release tape of the invention is rendered dimensionally stable by seal coating both sides of the substrate, such as paper, with a coating of a polyolefin, such as polyethylene. An overcoat of an unfilled organopolysiloxane is applied to one side and an overcoat of a filled organopolysiloxane is applied to the opposite side of the thus polyolefin-coated substrate.

Depending upon the type of substrate and the properties desired in the final product, it may or may not be desirable to prime or activate the surfaces of the substrate prior to application of said organopolysiloxane coatings thereto.

From the above it will be noted that in the practice of the invention the filled and unfilled organopolysiloxanes can be applied directly to the substrate as a coating and bonded directly thereto, or can be applied as an overcoat to a previously applied coating and thus indirectly bonded to said substrate. Thus, herein and in the claims, unless otherwise specified, the words "bonded" or "bonding" when employed in connection with an organopolysiloxane coating or overcoating on a substrate is employed generically and includes both said direct and indirect bonding to the substrate.

The above-described composite differential release tapes of the invention can be prepared in any manner known to the art for applying coating materials to substrates. All of the priming, coating, and activating operations described herein can be carried out "in line," i.e., continuously, employing conventional equipment. The coating materials described herein can be conveniently applied using rotogravure rolls but any other coating technique employing any other type of roll coater, knife coater, or other coating device which is capable of applying a coating of the coating material in the desired amount can be employed.

However, for best results and in accordance with the invention it is preferred that the various operations or steps carried out in fabricating the composite differential release tapes of the invention be carried out in a particular manner and sequence as set forth below. For convenience, these operations or steps are described in terms of employing paper as the substrate. However, as indicated above, it will be understood that the invention is not limited to employing paper as a substrate.

In the preparation of the above-described first embodiment, it is usually preferred that the coating operations or steps be carried out in the following order: (1) prime or activate one side of the paper substrate; (2) apply a first thin coat of a filled organopolysiloxane; (3) heat the coated paper in an oven to obtain an essentially dry film which is at least partially cured; (4) apply a second thin coat of a filled organopolysiloxane over said first thin coat; (5) heat the thus coated paper in an oven to obtain an essentially dry film which is at least partially cured; (6) age the thus coated paper for at least two days at room temperature to complete the curing of the silicone coating; and (7) repeat the above-numbered steps (1) to (6) for the opposite side of the paper substrate except use an unfilled organopolysiloxane instead of said filled organopolysiloxane.

In preparing the above-described second embodiment, it is usually preferred that the coating operations or steps be carried out in the following order: (1) prime or activate one side of the paper substrate; (2) extrusion coat said primed surface with a polyolefin and provide either a matte or a gloss finish; (3) activate said coating of polyolefin; (4) apply a first thin overcoating of a filled organopolysiloxane; (5) heat the thus coated and overcoated paper substrate in an oven to obtain an essentially dry film which is at least partially cured; (6) apply a second thin overcoating of a filled organopolysiloxane over said first thin coating of organopolysiloxane; (7) heat the thus coated and overcoated substrate in an oven to obtain an essentially dry film which is at least partially cured; (8) age the thus coated and overcoated substrate for at least two days to complete the curing of the organopolysiloxane coatings; (9) prime or activate the opposite side of the paper substrate; (10) apply a first thin coating of an unfilled organopolysiloxane to said opposite side of said substrate; (11) heat in an oven to obtain an essentially dry film which is at least partially cured; (12) apply a second thin coating of said unfilled organopolysiloxane over said first thin coat; (13) heat in an oven to obtain an essentially dry film which is at least partially cured; and (14) age the thus coated substrate for at least two days at room temperature.

In preparing the above-described preferred embodiment, it is usually preferred that the coating operations or steps be carried out in the following manner: (1) prime or activate one side of the paper substrate; (2) extrusion coat said primed or activated surface with a coating of a polyolefin and provide either a matte or gloss finish; (3) activate said polyolefin coating; (4) apply a first thin coat of a filled organopolysiloxane to said activated polyolefin coating; (5) heat in an oven to obtain an essentially dry film which is at least partially cured; (6) apply a second thin coating of a filled organopolysiloxane over said first thin coating; (7) heat in an oven to obtain an essentially dry film which is at least partially cured; (8) age the thus coated and overcoated substrate at room temperature for a period of at least two days; (9) remoisten or prime the opposite side of said paper substrate with an aqueous priming agent; and (10) repeat said steps (2)–(8) for the opposite side of said substrate except for using an unfilled organopolysiloxane instead of said filled organopolysiloxane.

If desired, both sides of the paper substrate can be coated with the polyolefin before applying the organopolysiloxane coatings to either polyolefin coating. If this procedure is followed, one should allow at least twenty-four hours between the application of the polyolefin coatings to the opposite sides of the substrate so as to provide time for the moisture in the paper to dissipate evenly therethrough before the paper is subsequently heated in curing the organopolysiloxane overcoats. Uneven distribution of moisture in the paper can lead to bubble or blister formation in the polyolefin coatings when the subsequently applied organopolysiloxane overcoats are cured.

The heating step can be carried out in one stage in a conventional manner. However, superior results are obtained when said heating is carried out in two successive stages. At least two things occur in the heating step which is applied to the organopolysiloxane coatings. One, the solvent contained in the coating material is evaporated. Two, curing of the organopolysiloxane coating material is initiated and at least partially completed. Said curing is accomplished by a crosslinking, condensation, and/or polymerization to give a hard, dry surface. It is essential that said heating of the organopolysiloxane overcoating material be accomplished without distorting the polyolefin coating thereunder.

Curing of said organopolysiloxane coating material can take place at room temperature depending upon the particular silicone material used and the particular curing agent or catalyst used in conjunction with said silicone material. However, for practical continuous operations the time required for curing at room temperature is too long. Most curing agents or catalysts are capable of promoting relatively rapid curing at moderately elevated temperatures. This temperature at which relatively rapid curing takes place is sometimes referred to as the curing initiating temperature even though curing will take place at room temperature. For the preferred organopolysiloxanes described herein this temperature is in the range of 180 to 250° F. Once curing has been initiated and maintained at an elevated temperature for a short period of time as described herein, the curing can then advantageously be allowed to proceed by aging at reduced temperatures, e.g., at room temperatures or moderately (25 to 50° F.) above. As mentioned above, it is essential that said curing be effected without distorting the polyolefin coating under the organopolysiloxane overcoating. Thus, the choice of temperature actually employed in the curing steps will depend upon a number of factors such as the type of polyolefin coating material used, the type of silicone overcoating material used, the curing catalyst used with said silicone material, and the rate at which the coated paper is passed through the heating zone. For example, polypropylene has a higher melting point than polyethylene; the temperature at which the silicone material cures is effected by the choice of curing catalyst; and the oven temperatures will vary with the rate at which the paper is passed therethrough.

Ideally, it is desirable in said heating and curing steps to heat the silicone overcoating material and not heat the polyolefin coating material thereunder. However, as a practical matter, this is practically impossible to accomplish. In any event, it is desired to heat and cure the organopolysiloxane overcoating material as rapidly as possible without heating the polyolefin coating thereunder sufficiently to cause distortion of said polyolefin coating. Thus, in the practice of the invention, it is preferred to increase the temperature of the silicone overcoated material the desired amount as rapidly as possible and then hold it at the increased temperature for a period of time sufficient to effect the desired amount of partial curing. Thus, in a preferred manner of practicing the invention, the coated and overcoated paper substrate is passed through a first and a second heating zone, in series. The temperature in said first heating zone will always be greater than the temperature in said second heating zone and will usually be within the range of from 250 to 560° F., preferably 325 to 375° F. The temperature in said second heating zone will usually be within the range of from 75 to 350° F., preferably within the range of from 225 to 275° F.

Prior to coating the paper substrate with silicon or polyolefin, it is desirable, but not essential, to prime the surface of the paper so as to improve the bond between same and the silicone or polyolefin. Any suitable priming material or method can be employed to accomplish this. Thus, the invention is not limited to any particular priming material or method.

Solutions of polyalkylene imines are one presently preferred priming material. These materials have the general formula

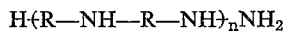

wherein R is an alkylene group containing from 2 to 4 carbon atoms and $n$ is an integer of from 1 to 2000, or higher. Polyalkylene imines utilized for treating the surface of the paper substrate may be of any desired molecular weight in which the material can be obtained. Generally speaking, however, it is advantageous to avoid the use of very low molecular weight materials having excessive volatilities. In most instances, but not limited thereto, it is preferred to employ the relatively low molecular weight polymers which are water soluble. However, it is within the scope of the invention to employ the higher molecular weight materials in solution or dispersed in a suitable solvent such as acetone, methyl ethyl ketone, and the lower alkyl alcohols containing less than 4 carbon atoms. Polyethylene imine is a presently most preferred priming agent. Aqueous solutions of polyethylene imine in water and consisting essentially of about 10 weight percent polyethylene imine are available. Generally, such solutions are diluted with more water to a polyethylene imine concentration of 0.5 to 2 weight percent prior to use. If desired, a small amount of a wetting agent such as sodium hexametaphosphate can be added. Generally speaking, such liquid priming agents are applied to the paper in an amount within the range of from about 1 to about 2.5 pounds per ream, on a wet basis.

If desired, the surface of the paper can be primed utilizing physical treatments instead of the above-described chemical treatment. For example, a flame treatment such as that disclosed in U.S. Patents 2,632,921; 2,683,894; or 2,746,084 can be employed. Or, one of the many forms of glow discharge, corona discharge, electrical bombardment, or otherwise termed electrical treatments such as those described in U.S. Patents 2,910,723; 3,018,180; or 2,935,418 can be used. Thus, the term "prime" or "priming" when employed in connection with treating the surface of the paper substrate, as used herein and in the claims, unless otherwise specified, includes either a chemical treatment or a physical treatment as described above.

The polyolefin can be extrusion coated onto the paper at extrusion temperature within the range of from 500 to 700° F., preferably 550 to 650° F., using any standard extrusion process known to the art. The process is conveniently carried out "in line," i.e., continuously. The amount of polyolefin coating applied to the paper substrate will usually be within the range of from 3 to 30, preferably from 7 to 15, pounds per ream. The same or different amounts of said polyolefin coating can be applied to the opposite sides of the paper substrate.

The term "polyolefin" as used herein and in the claims, unless otherwise specified, refers to the normally solid polymers of 1-olefin hydrocarbons. As employed herein and in the claims, unless otherwise specified, the terms "polymer" or "polymers" include homopolymers of said 1-olefins, copolymers of one of said 1-olefins with another of said 1-olefins as a comonomer; and blends of at least one of said copolymers with normally solid polyisobutylene. The polymers 1-olefins having from 2 to 4 carbon atoms per molecule are usually preferred. Examples of said homopolymers include polyethylene, polypropylene, poly-1-butene, and the like. An example of a copolymer within the above definition is a copolymer of ethylene with 1-butene having from 1 to 10, preferably 1.5 to 5, more preferably 1 to 3, weight percent of the 1-butene comonomer incorporated into the copolymer molecule. Examples of blends of said copolymers with polyisobutylene are those blends containing up to 35 weight percent, preferably from 1 to 35 weight percent of said polyisobutylene and from 99 to 65 weight percent of a copolymer of ethylene with one of said comonomers, e.g., 1-butene. Polyethylene is a presently preferred coating material. Generally speaking, the low density (about 0.91 g./cc.), high melt index (about 12), and the visbroken high density (about 0.95–0.96 g./cc.) polyethylenes are presently more preferred. Methods for preparing the above-described polymers are well known to those skilled in the art. If desired, the polyolefin coating may be activated prior to applying the organopolysiloxane overcoating material thereto to improve the bond. A variety of methods are known in the prior art for accomplishing this. As used herein and in the claims, unless otherwise specified, the terms "active," "activated," and "activation," when employed in connection with or describing a polyolefin surface, are intended to refer to a surface which has been pretreated by a process such as flame oxidation; chemical oxidation; treatment with a variety of agents such as ozone, chlorine, and various acids, various forms of electrical bombardment or discharge treatments, etc. For example, a flame treament such as that disclosed in U.S. Patents 2,632,921; 2,683,894; or 2,746,084 can be used. Or, a solution such as that disclosed in U.S. Patent 2,668,134 can be used. Or, preferably, one of the many forms of glow discharge, corona discharge, electrical bombardment, or otherwise termed electrical treatments such as those disclosed in U.S. Patents 2,910,723; 3,018,189; or 2,935,418 can be used. The apparatus and method for discharge treatment disclosed in said Patent 3,018,189 are a presently preferred way of pretreating or activating the polyolefin surface.

As used herein and in the claims, unless otherwise specified, the term "ream" refers to a ream containing 3000 square feet.

The following examples will serve to further illustrate the invention.

EXAMPLE I (Control)

One side of a bleached kraft paper, 53 pounds per ream, was primed in line at a rate of 300 lineal feet per minute with 1.75 pounds per ream, wet basis, of a priming solution consisting essentially of about 1.0 weight percent polyethylene imine, about 98.6 weight percent water, and about 0.4 weight percent of sodium hexametaphosphate. The excess water was driven off the primed paper by heating same to a temperature within the range of 100 to 150° F. The thus primed paper was extrusion coated at a rate of 300 lineal feet per minute on one side with 12 pounds per ream of a commercial polyethylene having a density of 0.915 gram per cc. and a melt index of 12.0, and the coating was provided with a matte finish. The reverse side of said paper was then primed in the same manner with the above-described priming solution and excess water driven off as described. Said reverse side was then extrusion coated at a rate of 300 lineal feet per minute with 12 pounds per ream of said commercial polyethylene, and the coating was provided with a gloss finish. The thus coated paper was then rolled into a roll and aged at room temperature for 24 hours.

The matte-finished polyethylene coat was then treated with a corona discharge from a Lepel spark generator set at about 1.2 watts per square foot per minute. The corona discharge-treated polyethylene coat was then silicone overcoated, employing a rotogravure cylinder with a 16 weight percent solution in toluene of an unfilled commercially available silicone material consisting essentially of a 30 weight percent solution in xylene of a copolymer like that of Formula 8 above wherein R is $CH_3$—, $x$ is about 95 and $y$ is about 5 to give a $CH_3/Si$ ratio of about 1.95. Prior to applying said solution of copolymer, there was added thereto 4.5 weight percent of dibutyl tin di-2-ethyl hexanoate (50% solution in xylene), based on the weight of said copolymer in said solution. Said overcoating solution was applied in an amount sufficient to give an overcoat weight of about 0.15 pound per ream, dry basis. The silicone overcoating was then partially cured by passing the web, at a rate of about 250 linear feet per minute, through a first oven heating zone having a length of about 12.5 feet and maintained at a temperature of 350° F., and then passing said web through a second oven heating zone having a length of about 12.5 feet and maintained at a temperature of 250° F. A second overcoating of said unfilled organopolysiloxane copolymer solution containing said catalyst was applied in the same manner on top of said first applied silicone overcoating. Said silicone overcoating was then at least partially cured by passing the web through said first and said second heating zones in the same manner and under the same conditions as the first silicone overcoat. Said second overcoat was also approximately 0.15 pound per ream, dry basis. The thus coated product was then run through said first and said second heating ovens in a dry pass run at the same rate and under the same temperature conditions so as to further advance the curing of the silicone overcoats and to prevent blocking in the roll. The gloss side of the web was then given a two-coat silicone overcoating using the same silicone composition and the same procedure as was used on the matte side, except that the polyethylene coat was not given a corona discharge treatment. Each silicone overcoat was applied in an amount of about 0.12 pound per ream, dry basis. The resulting silicone-coated web after curing was tested for release values and subsequent adhesion values employing a Keil testing machine. The results are given below:

|  | Test tape No. 1 | | Test tape No. 2 | |
| --- | --- | --- | --- | --- |
|  | Gloss side unfilled silicone | Matte side unfilled silicone | Gloss side unfilled silicone | Matte side unfilled silicone |
| Avg. release, g./inch | 27 | 25 | 46 | 67 |
| Avg. sub. adhesion, g./inch | 717 | 801 | 671 | 319 |

The above data demonstrate the small differences in release values obtained when both sides of a substrate are coated with an unfilled organopolysiloxane.

EXAMPLE II

A bleached kraft paper, 53 pounds per ream, was primed, dried, and coated on both sides with the same priming solution and the same polyethylene in the same manner as in Example I, except that the gloss-finished coat of polyethylene was applied first. One side was given a gloss finish and the reverse or opposite side was given a matte finish. The thus coated paper was rolled into a roll and aged at room temperature for 24 hours.

The gloss-finished polyethylene coat was then treated with a corona discharge from a Lepel spark generator set at about 1.2 watts per square foot per minute. The corona discharge-treated polyethylene was then silicone overcoated in the same manner as in Example I, i.e., employing a rotogravure cylinder with a 13 weight percent solution in toluene of the same unfilled commercially available silicone material used in Example I. Said overcoating solution was applied in two thin coats in an amount sufficient to give a total overcoat weight of about 0.2 pound per ream, dry basis. The thus coated paper was aged for five days.

The matte-finished surface was then given a two-coat silicone overcoating in essentially the same manner as in Example I. The polymeric silicone material was the same as that used in Example I. However, the silicone coating composition used was a filled composition having finely divided calcium carbonate incorporated therein. The particle size of said calcium carbonate was in the order of 10 microns or less. The total weight of the two coats was about 0.22 pound per ream, dry basis. The composition of said filled polymeric silicone coating composition was as follows, in weight percent: organopolysiloxane, 4.28; calcium carbonate, 8.55; xylene, 10.08; and toluene, 77.09. To this composition there was added, prior to use, 4.5 weight percent of dibutyl tin di-2-ethyl hexanoate (50% solution in xylene), based on said organopolysiloxane, as a curing catalyst. The resulting silicone-coated web after curing was tested for release values and subsequent adhesion values employing a Keil testing machine in the same manner as in Example I. The results are given below:

|  | Test tape No. 2 | |
| --- | --- | --- |
|  | Gloss side unfilled silicone | Matte side filled silicone |
| Avg. release, g./inch | 58 | 148 |
| Avg. sub. adhesion, g./inch | 697 | 317 |

The above data, when compared with the results obtained in Example I, show the marked increase in release values obtained when the grainy solid calcium carbonate was incorporated into the silicone overcoating composition.

EXAMPLE III

A bleached kraft paper, 53 pounds per ream, was primed on one side, dried, and the primed surface coated with polyethylene, gloss finish, in the same manner as in Examples I and II. The gloss-finished polyethylene coat was then treated, as before, with a corona discharge from a Lepel spark generator set at about 1.2 watts per square foot per minute. The corona discharge-treated polyethylene coat was then silicone overcoated, with two thin coats, using the same type of unfilled overcoating solution and in the same manner as described above in Example I. Said overcoating solution was applied in an amount sufficient to give a total overcoat weight of about 0.2 pound per ream, dry basis. The thus coated product was then aged at room temperature for two days to complete the curing of the silicone overcoatings.

The paper side of the thus coated product was then primed in line in the same manner as described above for the first priming operation. This priming operation served to prime the surface of the paper and also to remoisten said paper and replace the moisture which had been driven off during curing of the silicone overcoatings. Excess moisture from said priming operation was driven off as described above. The thus primed reverse side of the paper web was then extrusion coated as described above with 12 pounds per ream of the above-described polyethylene and the coating was provided with a matte finish.

The matte-finished surface was silicone overcoated with two thin coats in the same manner as in Example I. The polymeric silicone material was the same as that used in Example I. However, the silicone coating composition used was a filled composition having finely divided calcium carbonate suspended therein. The particle size of said calcium carbonate was in the order of 10 microns or less. The total weight of the two coats was about 0.29 pound per ream, dry basis. The composition of said filled polymeric silicone coating composition was as follows, in weight percent: organopolysiloxane, 4.8; calcium carbonate, 4.8; xylene, 11.4; and toluene, 79.00. To this composition there was added, prior to use, 4.5 weight percent of dibutyl tin di-2-ethyl hexanoate (50% solution in xylene), based on the weight of said organopolysiloxane, as a curing catalyst. The resulting silicone-coated web after curing was tested for release values and subsequent adhesion values employing a Keil testing machine in the same manner as in Example I. The results are given below:

|  | Test tape No. 2 | |
| --- | --- | --- |
|  | Gloss side unfilled silicone | Matte side filled silicone |
| Avg. release, g./inch | 56 | 90 |
| Avg. sub. adhesion, g./inch | 588 | 308 |

The above data, when compared with the results obtained in Example II, demonstrate that the difference between the release values of the two sides of the paper can be varied and controlled by varying the concentration of the grainy solid in the filled organopolysiloxane coating composition.

EXAMPLE IV

Another composite differential release paper was prepared using the same type paper substrate (except the paper weight was 70 pounds per ream) and in the same manner as in Example III, except for the filled organopolysiloxane coating composition which was used. The composition of said coating composition, in weight percent, was as follows: organopolysiloxane (same as in Example III), 4.23; vinyl chloride polymer (specific gravity, 1.4; inherent viscosity, 1.27), 1.40; xylene, 9.87; diisobutyl ketone, 42.25; and Apco solvent (a light naphtha), 42.25. To said composition there was added, before use, 4.5 weight percent of dibutyl tin di-2-ethyl hexanoate (50% solution in xylene), based on the weight of said organopolysiloxane, as a curing catalyst. The resulting web, after curing, was tested for release values and subsequent adhesion values employing a Keil testing machine in the same manner as in the other examples. The results are given below:

|  | Test tape No. 2 | |
| --- | --- | --- |
|  | Gloss side unfilled silicone | Matte side filled silicone |
| Avg. release, g./inch | 68 | 145 |
| Avg. sub. adhesion, g./inch | 546 | 353 |

The above data demonstrate the increase in release value which is obtained when finely divided solids of an organic filler [poly(vinyl chloride)] are incorporated in an organopolysiloxane.

Essentially, the Keil tester is designed to strip tapes from test surfaces at a constant speed pull of 12 inches per minute. The pull is measured on a dial spring balance as the tap is stripped. Supplied with the Keil tester (locked in place at the base of the machine) is a stainless steel test panel, 3 inches by 6 inches by 1/16 inch. This serves as the control surface to determine the "subsequent adhesion" of the tape—its adhesive qualities after contact with the coated paper. Further details regarding said Keil tester and its operation can be obtained from Dow Chemical Co., Midland, Mich.

Generally speaking, any suitable pressure-sensitive tape can be employed in running said modified Keil tests. One suitable tape is Johnson and Johnson Red Cross Waterproof Adhesive Tape. This tape was used as tape No. 2 in the above tests. Another tape is pressure-sensitive adhesive coated Scotchcal Brand Film Type 3, manufactured by Minnesota Mining and Manufacturing Company. This tape was used as tape No. 1 in the above tests.

Throughout the continuous "in line" operations described herein, e.g., the priming, polyolefin coating, silicone coating, and drying, the paper can be run at any suitable speed within the range of from 50 to 3000 linear feet per minute. Generally speaking, it is preferred to carry out said operations at paper speeds within the range of from 100 to 1000 linear feet per minute, more preferably 250 to 600 linear feet per minute.

The composite differential release tapes of the invention can be manufactured in any convenient widths and lengths depending upon the end use of the tape. For example, the tapes can be manufactured using sheets or rolls of paper of widths and lengths commonly used in the paper industry. The finished web of tape can then be slit into tapes of the desired width and, if necessary, cut to the desired length.

In using said tapes, for example in preparing rolls of an adhesive or mastic as discussed above, said adhesive or mastic can be placed on the side of the tape having the lowest release value. The tape and adhesive are then rolled up, during which rolling the side of the tape having the highest release value comes into contact with said adhesive, leaving one side of the adhesive exposed. This exposed adhesive is covered with a protective cover. When it is desired to use the roll, the protective cover is removed and the adhesive or mastic placed where desired, as described above.

I claim:

1. A composite differential release tape comprising: a substrate; a cured coating of a filled organopolysiloxane bonded to one side of said substrate; and a cured coating of an unfilled organopolysiloxane bonded to the opposite side of said substrate; said filled organopolysiloxane having incorporated therein finely divided particles of a filler in an amount sufficient to increase the release value of said cured filled organopolysiloxane coating to a value greater than the release value of said cured unfilled organopolysiloxane coating.

2. A composite differential release tape according to claim 1 wherein: each said organopolysiloxane has an R/Si ratio within the range of about 1 to about 2, said R being a monovalent hydrocarbon radical.

3. A composite differential release tape according to claim 2 wherein said substrate is paper, and said R/Si ratio is within the range of from about 1.75 to less than 2.

4. A composite differential release tape according to claim 1 wherein: said substrate is paper coated on one side with a normally solid polymer of a 1-olefin; and one of said organopolysiloxane coatings is bonded to said coating of a polymer of a 1-olefin as an overcoat.

5. A composite differential release tape according to claim 1 wherein: said substrate is paper coated on one side with a normally solid polymer of a 1-olefin; and said coating of a filled organopolysiloxane is bonded to said coating of a polymer of a 1-olefin as an overcoat.

6. A composite differential release tape according to claim 1 wherein: said substrate is paper coated on one side with a first coating of a normally solid polymer of a 1-olefin containing from 2 to 4 carbon atoms per molecule and on the other side with a second coating of a normally solid polymer of a 1-olefin containing from 2 to 4 carbon atoms per molecule; said coating of a cured filled organopolysiloxane is bonded to said first coating of a polymer of a 1-olefin as an overcoat; and said coating of a cured unfilled organopolysiloxane is bonded to said second coating of a polymer of 1-olefin.

7. A composite differential release tape according to claim 6 wherein each of said organopolysiloxanes is a copolymer consisting essentially of the recurring structural units

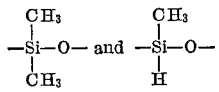

8. A composite differential release tape according to claim 7 wherein: the $CH_3$/Si ratio is within the range of from about 1.95 to 1.99; said polymer of a 1-olefin is a polymer of ethylene; and each of said organopolysiloxane overcoats is present in an amount, on a dry basis, within the range of from 0.03 to 0.4 pound per ream.

9. A composite differential release tape according to claim 8 wherein said filler is calcium carbonate, and is present in a filler to organopolysiloxane solids weight ratio within the range of from 0.25:1 to 3:1.

10. A composite differential release tape according to claim 8 wherein said filler is poly(vinyl chloride), and is present in a filler to organopolysiloxane solids weight ratio within the range of from 0.25:1 to 3:1.

11. A method of making a composite differential release tape, which method comprises: applying a coating of an unfilled organopolysiloxane to one side of a substrate; applying a coating of a filled organopolysiloxane having incorporated therein a predetermined amount of finely divided particles of a filler to the reverse side of said substrate; curing each of said organopolysiloxane coatings; and controlling the difference in release values between said two sides of said substrate by varying said amount of said filler contained in said filled organopolysiloxane.

12. A method according to claim 11 wherein said substrate is paper, and said method further comprises: applying a first coating of a normally solid polymer of a 1-olefin containing from 2 to 4 carbon atoms per molecule to one side of said paper; applying a second coating of a normally solid polymer of a 1-olefin containing from 2 to 4 carbon atoms per molecule to the reverse side of said paper; said coating of an unfilled organopolysiloxane is applied over said first coating of 1-olefin polymer as an overcoat; said coating of a filled organopolysiloxane is applied over said second coating of 1-olefin polymer as an overcoat; and each of said organopolysiloxanes is a copolymer consisting essentially of the recurring structural units

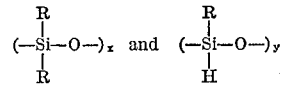

wherein R is selected from the group consisting of methyl, ethyl, and phenyl, $x$ is an integer of from 75 to 99, and $y$ is an integer of from 1 to 25 to give an R/Si ratio within the range of from 1.75 to 1.99.

13. A method according to claim 12 wherein: R is methyl; the $CH_3$/Si ratio is within the range of from about 1.95 to 1.99; said 1-olefin polymer is a polymer of ethylene; and each of said organopolysiloxane overcoats is applied in an amount, on a dry basis, within the range of from 0.03 to 0.4 pound per ream.

14. A method according to claim 13 wherein said filler is calcium carbonate and is present in a filler to organopolysiloxane solids weight ratio within the range of from 0.25:1 to 3:1.

15. A method according to claim 13 wherein said filler is poly(vinyl chloride) and is present in a filler to organopolysiloxane ratio within the range of from 0.25:1 to 3:1.

References Cited

UNITED STATES PATENTS

| 3,214,285 | 10/1965 | Wissinger et al. | 117—76 X |
| 3,166,186 | 1/1965 | Karn | 161—406 |
| 3,076,726 | 2/1963 | Ault et al. | 117—122 X |
| 2,940,884 | 6/1960 | White | 161—406 X |

ALFRED L. LEAVITT, *Primary Examiner.*

A. GRIMALDI, *Assistant Examiner.*

U.S. Cl. X.R.

117—122, 76; 161—406; 117—68.5